Jan. 24, 1956  J. P. NOLL  2,731,784
CLEANING ATTACHMENT FOR RAKES
Filed Oct. 22, 1954
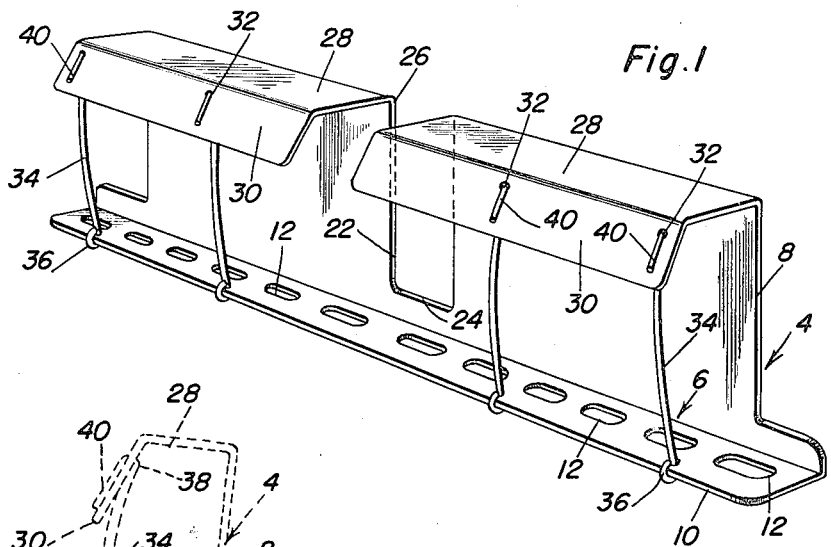
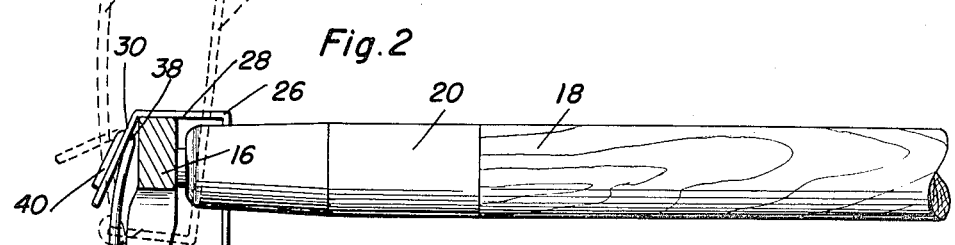
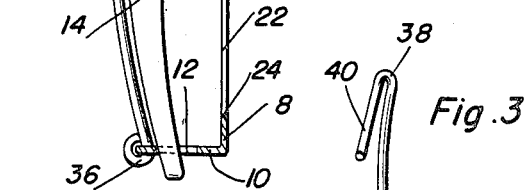
Joseph P. Noll
INVENTOR.

United States Patent Office 2,731,784
Patented Jan. 24, 1956

2,731,784

CLEANING ATTACHMENT FOR RAKES

Joseph P. Noll, Eatontown, N. J.

Application October 22, 1954, Serial No. 463,899

4 Claims. (Cl. 56—400.08)

The present invention relates to a structurally distinct device which is herein conveniently designated as a readily applicable and removable toothed rake head attachment, the latter being such in construction that it functions aptly and efficiently to keep the teeth of said head from becoming clogged with grass, leaves, twigs, stones and similar debris.

As is clearly implied in the preceding general statement of the nature of the invention, persons familiar with developments in this field of endeavor will readily appreciate that many and varied styles and forms of rake tooth cleaners and clearers have been devised and otherwise offered for keeping rake teeth clear of accumulations while the rake is being used. Also, and as is accomplished in the instant matter, prior art adaptations have been perfected so that they are substantially automatic in operation, that is, are lifted up to expose the lower ends of the tines or teeth for raking purposes during the raking stroke and dropped down under the force of gravity when the rake is lifted on the return stroke clear of the ground. Keeping in mind the state of development of the art to which the invention relates, it is an object of the invention here to provide a similarly attached and performing attachment which is so designed and constructed that it may be more expeditiously applied and removed, and, once in position, will remain in its intended operating position and will achieve the desired end results in a manner which is thought to be satisfactory from all reasonable points of view.

In keeping with a desire to advance the art and provide members of the public with a better constructed and more efficiently functioning rake cleaner attachment, I provide one which is characterized by a plate having a lateral flange along its bottom with spaced openings therein and through which the teeth of said rake head extend, having at least one lateral flange on its top which extends over the back of said rake head, said plate also having a handle accommodation notch which is slidably cooperable with the usual handle which is attached to said head, and means for securely but detachably securing said attachment to said head.

More specifically comprehended, the preferred embodiment of the invention has to do with the aforementioned plate which substantially parallels the teeth in the rake head and which has top and bottom flanges in vertically spaced horizontal planes and in approximate parallelism, the top flange having a downbent free edge portion provided with keeper holes to accommodate hook-like bends or formations on latch-like wire members which are pivotally attached to the bottom flange, whereby to provide an assemblage which achieves the intended results with the utmost in simplicity of construction and thus meets the requiremetns of manufacturers and needs of users to the advantage of all concerned.

Other objects, features and advantages will become more readily apparent from the following description and the accompanying sheet of illustrative drawings.

In the drawings, wherein like numerals are employed to designate like parts throughout the views:

Figure 1 is a perspective view of a rake cleaner attachment constructed in accordance with the principles of the present invention;

Figure 2 is a view of the same in section and elevation and showing the manner in which it functions when operatively associated with the conventional rake head; and Figure 3 is an enlarged perspective view of one of the aforementioned latch-like wire assembling and retaining members.

Broadly speaking, the over-all attachment is characterized by the sheet metal or equivalent cleaner attachment 4 and the complemental latch-type assembling and retaining members 6 therefor.

The part 4 is characterized by a substantially flat vertically disposed plate 8, the lower edge portion of which is provided with a right angularly disposed so-called bottom flange 10 having elongated openings or slots 12 to accommodate the teeth or tines 14 of the rake head. The so-called bar member of the "back" of the rake head is denoted at 16, while the handle is denoted at 18, the same attached to the back by way of a ferrule and shank, the ferrule denoted at 20. There is a centrally disposed vertical accommodation and clearance notch 22 in the plate 8 with the lower end closed, as at 24, and the upper end open, as at 26. Flange means is also provided at the top of the plate, and this is actually made up of complemental so-called top flanges 28—28 which are duplicates of each other. These are on opposite sides of the notch and they have longitudinal edge portions which are angularly and downwardly bent at approximate oblique angles and which are here denoted by the numerals 30—30. These downbent edge portions have spaced holes 32 which are conveniently referred to as keeper holes.

The latch members each comprise a wire member 34 having an eye 36 hingedly attached to the flange 10 and having the upper end bent upon itself as at 38 (see Figure 3) and then formed into a hook-like terminal 40 which is here conveniently called a keeper. These keepers 40 are releasably connected with the keeper holes, in an obvious manner. The latch-like members bridge the opening between the flange 10 and the downbent edge portions 30 of the flanges 28—28. Thus, the plate is on one side of the rake teeth, and the latch-like members on the other side, whereby the attachment is effectually harnessed or bridled in place. It will be clear, too, that by reason of the handle extending through the notch 24, the cleaner attachment as a unit is allowed to rise and fall, in an obvious manner. That is to say, while raking any trash that builds up by accumulation on or between the rake teeth will serve to lift the cleaner attachment up, and then, when the rake is picked up bodily and moved from the finished stroke to the beginning of the next stroke, the attachment, because of its own weight, will drop down and scrape or clear the trash from the teeth and keep the same substantially clean. As before stated, devices accomplishing this said result are old in the art, but none is constructed as the attachment herein revealed.

It will be clear, of course, that the rake with the attachment applied thereto is used more or less in the usual or customary way, and when the teeth are brought into contact with the ground, the material on the surface will lift the attachment as the rake is bodily raised up, in customary fashion, to begin the next stroke. The attachment will dislodge and push the accumulated or clinging matter from the rake teeth. Should a twig catch in the rake and the weight of the attachment be not enough to automatically dislodge it, a bodily shake of the handle will agitate the attachment and the twig can be pushed off. If a stone should wedge between the tines, the rake can be turned over and struck on the back of the attachment against the ground, using the handle for this operation in an obvious manner. It will be appreciated that one of the principal aspects of the invention is the valuable time its use saves. Also, one may treat as an outstanding feature the fact that the user of the rake need not use the fingers of his hand to clear the rake as is often done and to run the risk of touching poisonous growths of one kind or another.

It will be noticed that the end portions of the plate are notched out, and this serves to permit the attachment to be appropriately attached to a fork rake, which type of rake has braces at the ends of the tines.

From the foregoing, the construction and operation of the device will be readily understood and further explanation is believed to be unnecessary. However, since numerous modifications and changes will readily occur to those skilled in the art, it is not desired to limit the invention to the exact construction shown and described, and accordingly, all suitable modifications and equivalents may be resorted to, falling within the scope of the appended claims.

What is claimed as new is as follows:

1. A toothed rake head cleaner in the form of an attachment comprising a plate having a lateral flange along its bottom with spaced openings therein and through which the teeth of said rake head extend, having at least one lateral flange on its top which extends over the back of said rake head, said plate also having a handle accommodation notch which is slidably cooperable with the usual handle which is attached to said head, and means for securely but detachably securing said attachment to said head.

2. The structure defined in claim 1 and wherein said means embodies latch-like elements carried by said first named flange.

3. A toothed rake head cleaner in the form of an attachment comprising a plate having a lateral flange along its bottom with spaced openings therein and through which the teeth of said rake head extend, said plate having a centrally positioned rake handle accommodating notch closed at its lower end in close proximity and having its upper end opening through the upper edge of said plate, lateral flanges carried by the upper lengthwise portion of said plate adapted to overlie the back of said rake head, said latter flanges having free longitudinal edge portions bent downwardly toward said first named flange, and latch-like members carried by said first named flange and releasably connectible with said downwardly bent edge portions.

4. A toothed rake head cleaner in the form of an attachment comprising a plate having a lateral flange along its bottom with spaced openings therein and through which the teeth of said rake head extend, said plate having a centrally positioned rake handle accommodating notch closed at its lower end in close proximity and having its upper end opening through the upper edge of said plate, lateral flanges carried by the upper lengthwise portion of said plate adapted to overlie the back of said rake head, said latter flanges having free longitudinal edge portions bent downwardly toward said first named flange, and a plurality of latch forming wire members, each comprising a length of wire hingedly connected at its lower end to said first named flange, bridging the space between said latter flange and the downwardly bent edge portion, the latter having keeper holes therein and the free end of said member being provided with a hook-like bend functioning as a keeper and releasably connected with a cooperating keeper hole.

No references cited.